United States Patent
Ju et al.

(10) Patent No.: US 12,537,681 B2
(45) Date of Patent: Jan. 27, 2026

(54) ENCRYPTION METHOD USING FIXED-BASE COMB METHOD

(71) Applicant: Samsung Electronics Co., Ltd., Suwon-si (KR)

(72) Inventors: Jangwon Ju, Suwon-si (KR); Jongyeon Park, Suwon-si (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 147 days.

(21) Appl. No.: 18/499,571

(22) Filed: Nov. 1, 2023

(65) Prior Publication Data

US 2024/0171395 A1    May 23, 2024

(30) Foreign Application Priority Data

Nov. 4, 2022 (KR) .......... 10-2022-0146367
Mar. 15, 2023 (KR) .......... 10-2023-0034172

(51) Int. Cl.
*H04L 9/30* (2006.01)
*H04L 9/08* (2006.01)
*H04L 9/14* (2006.01)

(52) U.S. Cl.
CPC .......... *H04L 9/3066* (2013.01); *H04L 9/0869* (2013.01); *H04L 9/14* (2013.01)

(58) Field of Classification Search
USPC .......................................................... 380/46
See application file for complete search history.

(56) References Cited

U.S. PATENT DOCUMENTS

| | | | |
|---|---|---|---|
| 8,160,245 B2 | 4/2012 | Ebeid | |
| 8,243,919 B2 | 8/2012 | Ebeid | |
| 8,243,920 B2 | 8/2012 | Golic | |
| 8,422,685 B2 | 4/2013 | Al-Somani et al. | |
| 10,404,459 B2 | 9/2019 | Ghosh et al. | |
| 2009/0214023 A1* | 8/2009 | Al-Somani | H04L 9/003 380/28 |
| 2010/0067690 A1* | 3/2010 | Han | G06F 7/725 380/28 |

(Continued)

FOREIGN PATENT DOCUMENTS

| | | | | |
|---|---|---|---|---|
| KR | 20040053833 A | * | 6/2004 | .......... H04L 9/3066 |
| KR | 102253211 B1 | | 5/2021 | |

*Primary Examiner* — Sanchit K Sarker
(74) *Attorney, Agent, or Firm* — Harness, Dickey & Pierce, P.L.C.

(57) ABSTRACT

An elliptic curve encryption method includes determining a window size indicating a number of groups for performing scalar multiplication in parallel, generating, based on a first encryption key, a second encryption key, the generating the second encryption key including changing a value of the first encryption key, the first encryption key being a random number, generating a third encryption key based on the second encryption key, the generating the third encryption key including changing a total number of bits of the second encryption key to be a multiple of the window size by applying a binary number-based value conversion method, and performing, in parallel, a scalar multiplication operation with the third encryption key and a vector on an elliptic curve based on the window size, wherein the second encryption key has a value conforming to the binary number-based value conversion method.

9 Claims, 11 Drawing Sheets

(56) References Cited

U.S. PATENT DOCUMENTS

2010/0183142 A1* 7/2010 Katagi .................... G06F 7/725
  380/28
2013/0163760 A1* 6/2013 Ye ........................... G06F 7/725
  380/270
2014/0344579 A1 11/2014 Struik et al.

* cited by examiner

ENCRYPTION METHOD USING FIXED-BASE COMB METHOD

CROSS-REFERENCE TO RELATED APPLICATION

This U.S. non-provisional application claims the benefit of priority under 35 U.S.C. § 119 to Korean Patent Application No. 10-2022-0146367, filed on Nov. 4, 2022, and Korean Patent Application No. 10-2023-0034172, filed on Mar. 15, 2023, in the Korean Intellectual Property Office, the disclosures of each of which are incorporated by reference herein in their entireties.

BACKGROUND

Various example embodiments of the inventive concepts relate to an encryption method, a non-transitory computer readable medium storing computer readable instructions for performing the encryption method, and/or an apparatus for performing the encryption method, etc., and more particularly, to an encryption method using a fixed-base comb method, a non-transitory computer readable medium storing computer readable instructions for performing the encryption method using the fixed-base comb method, and/or an apparatus for performing the same, etc.

In cryptographic algorithms, for example, Elliptic Curve Digital Signature Algorithm (ECDSA) and Elliptic-Curve Diffie-Hellman (ECDH) signatures, the implementation of fast operation and stable operation are very important factors. Recently, as the demand for fast computational algorithms increases, the desire and/or need for fast computational algorithms has increased, and to this end, a fixed-base comb method may be used.

Using the fixed-base comb method to perform data encryption allows for the performance of an encryption operation on several bits at once, thereby performing the encryption operation quickly. However, a scalar value having a variable length may be input during the encryption process. In this case, the bit length of an operand has to be changed to a variable bit length in order to use the fixed-base comb method.

SUMMARY

Various example embodiments of the inventive concepts provide an encryption method using a fixed-base comb method, an encryption method using a fixed-base comb method, and/or an apparatus for performing an encryption method using a fixed-base comb method, etc.

The objectives to be solved by the inventive concepts are not limited to the above-mentioned technical objectives, and other technical objectives not mentioned herein will be clearly understood by those skilled in the art from the following description.

According to at least one example embodiment of the inventive concepts, there is provided an elliptic curve encryption (ECC) method including determining a window size indicating a number of groups for performing scalar multiplication in parallel, generating, based on a first encryption key, a second encryption key, the generating the second encryption key including changing a value of the first encryption key, the first encryption key being a random number, generating a third encryption key based on the second encryption key, the generating the third encryption key including changing a total number of bits of the second encryption key to be a multiple of the window size by applying a binary number-based value conversion method, and performing, in parallel, a scalar multiplication operation with the third encryption key and a vector on an elliptic curve based on the window size, wherein the second encryption key has a value conforming to the binary number-based value conversion method.

According to at least one example embodiment of the inventive concepts, there is provided an ECC method including determining a window size indicating a number of groups for performing scalar multiplication in parallel, generating a random number, changing the random number to an even number in response to a first encryption key being an odd number, changing the random number to an odd number in response to the first encryption key being an even number, generating a second encryption key by adding the first encryption key to a first value, the first value obtained by multiplying the random number by an additive identity in an addition operation of an elliptic curve, generating a third encryption key by changing a total number of bits of the second encryption key to be a multiple of the window size, and performing, in parallel, a scalar multiplication operation on the third encryption key and a vector on the elliptic curve based on the window size.

According to at least one example embodiment of the inventive concepts, there is provided an electronic device including a memory buffer configured to store at least one encryption key and a vector on an elliptic curve, and processing circuitry configured to, perform elliptic curve cryptography (ECC) by, determining a window size indicating a number of groups for performing scalar multiplication in parallel, determining a window size indicating a bit length of groups for performing scalar multiplication in parallel, generating, based on a first encryption key, a second encryption key, the second encryption key being an odd number, generating a third encryption key by changing a total number of bits of the second encryption key to be a multiple of the window size, and performing, in parallel, a scalar multiplication operation on the third encryption key and the vector based on the window size.

BRIEF DESCRIPTION OF THE DRAWINGS

Various example embodiments will be more clearly understood from the following detailed description taken in conjunction with the accompanying drawings in which.

DETAILED DESCRIPTION

Hereinafter, various example embodiments of the inventive concepts will be described in detail with reference to the accompanying drawings.

Figure 1:
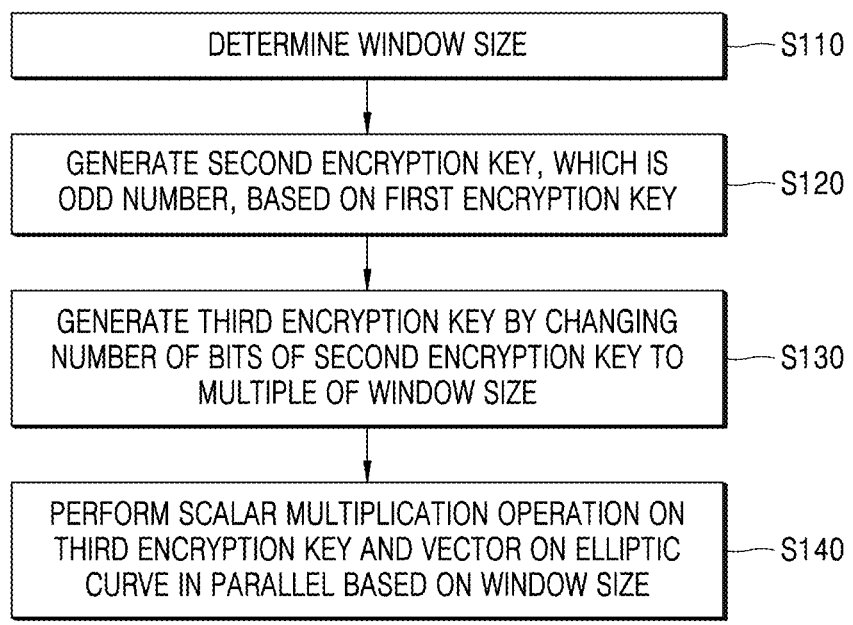
FIG. 1 is a flowchart of an encryption method according to at least one example embodiment.

FIG. 1 is a flowchart of an encryption method according to at least one example embodiment. According to at least one example embodiment, the encryption method of FIG. 1 may be performed by an electronic device, processing circuitry, and/or a computing device, etc. Examples of the electronic device, processing circuitry, and/or computing device is discussed in further detail in connection with FIGS. 9 to 11, but the example embodiments are not limited thereto.

In an elliptic curve cryptography (ECC) method of encrypting data using points on an elliptic curve, a scalar multiplication operation of a scalar value and a vector may be performed. A scalar value in scalar multiplication may correspond to an encryption key and a vector may correspond to a point on an elliptic curve. In the scalar multiplication operation, when the number of bits of a scalar value is large, it may take a lot of time for the scalar multiplication operation. Thus, a method of speeding up the scalar multiplication operation may be desired and/or required. For example, in order to increase the operation speed of scalar multiplication, a method of dividing a scalar value by a desired number of bits (for example, dividing an 8-bit scalar value into two parts of 4 bits each) and multiplying the divided scalar values and a vector in parallel may be used. When a multiplication operation is performed by dividing a scalar value, the scalar multiplication operation is performed in parallel, and thus, the time required for scalar multiplication may be reduced. A method of performing a scalar multiplication operation in parallel is, for example, a fixed-base comb method. As described above, the fixed-base comb method is a method of performing an operation of multiplying scalar values by a vector in parallel by dividing the scalar value by bits when performing the scalar multiplication operation. The fixed-base comb method is described in more detail below.

Referring to FIG. 1, according to the encryption method according to at least one example embodiment, a window size may be determined in operation S110.

A value indicating how many bits to divide a scalar value into in order to perform a multiplication operation between a scalar value and a vector in parallel may be referred to as a window size. For example, when an 8-bit scalar value is divided into 4 pieces, the 8-bit scalar value may be divided into 4 pieces of 2 bits each, but the example embodiments are not limited thereto. In this case, the window size may be 4, but is not limited thereto.

In an encryption method according to at least one example embodiment, the fixed-base comb method may be used and a window size may be determined and/or obtained to use to divide bits of a scalar value. Also, the window size may be determined based on the capacity of buffers (e.g., memory buffers, etc.) desired and/or required to perform a multiplication operation for a scalar value and a vector. For example, the larger the capacity of a buffer used to perform scalar multiplication, a larger window size may be used. As the window size increases, the time for performing scalar multiplication may be reduced.

In the encryption method according to at least one example embodiment, in operation S120, a second encryption key, which is an odd number, may be generated based on a first encryption key.

In order to use the fixed-base comb method described above, the number of bits of a scalar value is a multiple of the window size. Accordingly, when the number of bits of a scalar value is variable, a method of changing the number of bits of the scalar value may be desired and/or required.

For example, a signed digit representation method may be used in a method of changing the number of bits of a scalar value, but the example embodiments are not limited thereto. The signed digit representation method is a method of changing the number of bits of a scalar value of a binary number to a desired number of bits, which is expressed by adding a value of −1 to the binary number. When using the signed digit representation method, if a scalar value to be changed is an odd number, the scalar value may be expressed in binary by using only 1 and −1 and if the scalar value to be changed is an even number, values of 1, 0, and −1 may be used to express the scalar value in binary. In the encryption method according to at least one example embodiment, a scalar value may be expressed with only 1 or −1 by using the signed digit representation method. In order to express a scalar value with only 1 and −1, the scalar value, the number of bits of which are to change needs to be an odd number, and if the scalar value is an even number, it may be desired and/or necessary to change the corresponding even value to an odd number that may be matched. Accordingly, a process of changing the scalar value corresponding to the first encryption key to a second encryption key having an odd value may be desired and/or required. For example, a scalar blinding method may be used as a method of changing a scalar value corresponding to the first encryption key to the second encryption key, which is an odd number, but the example embodiments are not limited thereto. Detailed information on scalar blinding is described below.

In the encryption method according to at least one example embodiment, in operation S130, the number of bits of the second encryption key may be changed to a multiple of the window size. For example, a third encryption key may be generated by changing the number of bits of the second encryption key to a multiple of the window size by applying a binary number-based value conversion method, but the example embodiments are not limited thereto. For example, the binary number-based value conversion method may be the signed digit representation method, but is not limited thereto. Also, the second encryption key may have a value conforming to the binary number-based value conversion method, but is not limited thereto. In detail, the second encryption key may be an odd number.

As described above, in order to use the fixed-base comb method, the number of bits of a scalar value is a multiple of a window size. Accordingly, the third encryption key may be generated by changing the number of bits of the second encryption key to a multiple of the window size by using the signed digit representation method described above, etc.

In the encryption method according to at least one example embodiment, in operation S140, a scalar multiplication operation may be performed on the third encryption key and a vector on an elliptic curve in parallel based on the window size. In detail, in the encryption method, the bits of the third encryption key may be divided according to and/or based on the window size, and a multiplication operation between the vector and the scalar value may be performed. For example, according to the encryption method, scalar multiplication may be performed in parallel by using the fixed-base comb method based on the window size and the number of bits of the third encryption key.

According to the encryption method according to at least one example embodiment, by multiplying a scalar value and a vector in parallel, the time desired and/or required for scalar multiplication may be reduced and/or encryption may be performed at a high speed and/or increased speed, etc.

Figure 2:
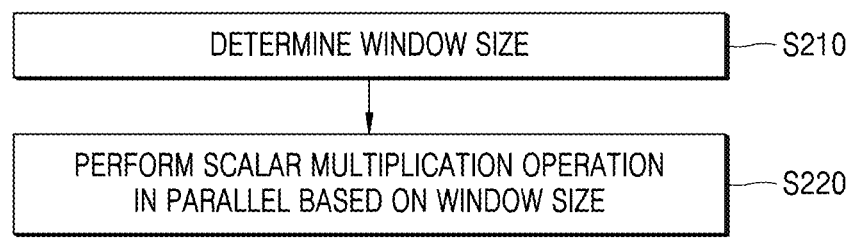
FIG. 2 is a flowchart for describing an encryption method according to at least one example embodiment.

FIG. 2 is a flowchart for describing an encryption method according to at least one example embodiment. According to at least one example embodiment, the encryption method of FIG. 2 may be performed by an electronic device, processing circuitry, and/or a computing device, etc. Examples of the electronic device, processing circuitry, and/or computing device is discussed in further detail in connection with FIGS. 9 to 11, but the example embodiments are not limited thereto.

Referring to FIG. 2, in the encryption method according to at least one example embodiment, a window size may be determined in operation S210.

In the encryption method, a window size may be determined to perform a scalar multiplication operation in parallel. For example, in the encryption method, a window size may be determined to perform a scalar multiplication operation by using a fixed-base comb method, but the example embodiments are not limited thereto.

The window size may be determined based on the capacity of buffers desired, available, and/or required for scalar multiplication. For example, the larger the capacity of buffers required for scalar multiplication, a larger window size may be set, etc. In other words, the window size may be dependent on the size of the buffers.

In the encryption method according to at least one example embodiment, in operation S220, a scalar multiplication operation may be performed in parallel based on the window size. For example, according to the encryption method, the scalar multiplication operation may be performed using a fixed-base comb method, by determining a window size and dividing bits of a scalar value into as many bits as the window size, but the example embodiments are not limited thereto.

For example, it may be assumed that a scalar value is 185, a vector is P, and a scalar multiplication operation of the scalar value and the vector P is to be performed for encryption, but the example embodiments are not limited thereto. Here, the scalar value may be expressed as $10111001_2$ in binary, and thus, the scalar value is an 8-bit number. Assuming that the window size is 2, the scalar value expressed as a binary number may be divided into two pieces of 4 bits each, but the example embodiments are not limited thereto. In detail, the scalar value may be divided into 1011, which is the first four bits of $10111001_2$, and 1001, which is the last four bits. When a scalar multiplication operation is performed by applying the fixed-base comb method, multiplication by a vector may be performed in parallel from the left front digit (e.g., the most significant bit) of each of 1011 bits and 1001 bits. In detail, scalar multiplication may be performed as (8P*24+8P)+(0*P*24+0*P)+(2P*24+0*P)+ (P*24+P)=185P.

When the algorithm of the fixed-base comb method is expressed in code, it may be as follows, but the example embodiments are not limited thereto.

TABLE 1

Algorithm 1. Fixed-base comb method for scalar multiplication

INPUT: Window-width w, d = ⌈t/w⌉, k = $(k_{t-1}, \ldots, k_1, k_0)_2$, P ∈ $E(\mathbb{F}_q)$
OUTPUT: Q = kP
0. (Precomputing operation) Compute $[a_{w-1}, \ldots, a_1, a_0]P$ = $a_{w-1} 2^{(w-1)d} P + \ldots + a_1 2^d P + a_0 P$ for all bit strings $(a_{w-1}, \ldots, a_1, a_0)$ of length w.
1. By padding k on the with 0s if necessary, write k = $K^{w-1} || \ldots || K^1 || K^0$ where each $K^j$ is a bit string of length d. Let $K_i^j$ denote the i-th bit of $K^j$.
2. Q ← ∞.
3. For i from d − 1 down to 0 do
   3.1. Q ← 2Q.
   3.2. Q ← Q + $(K_i^{w-1}, \ldots, K_i^1, K_i^0)_2 P$.
4. Return Q.

Figure 3:
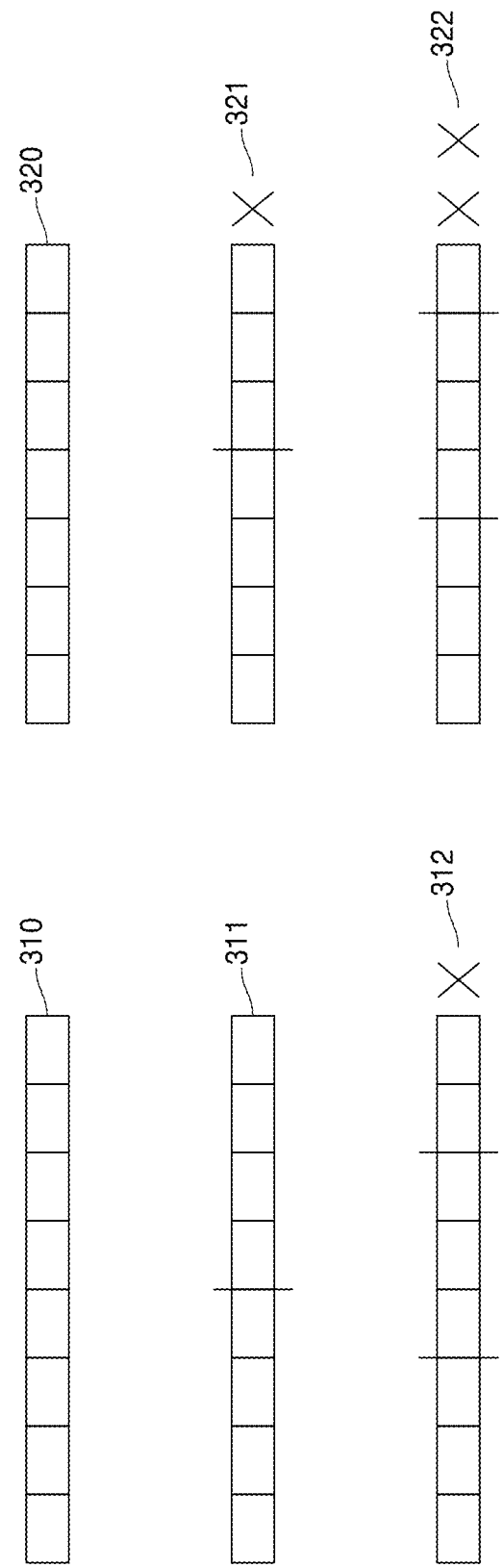
FIG. 3 is a diagram for describing an encryption method according to at least one example embodiment.

FIG. 3 is a diagram for describing an encryption method according to at least one example embodiment. According to at least one example embodiment, the encryption method of FIG. 3 may be performed by an electronic device, processing circuitry, and/or a computing device, etc. Examples of the electronic device, processing circuitry, and/or computing device is discussed in further detail in connection with FIGS. 9 to 11, but the example embodiments are not limited thereto.

Referring to FIG. 3, according to the encryption method according to at least one example embodiment, a scalar multiplication operation may be performed using a fixed-base comb method, but is not limited thereto. However, in order to perform a scalar multiplication operation using the fixed-based comb method, the number of bits of a scalar value is to be a multiple of a window size.

For example, a scalar value may be expressed as a binary number and may be expressed as 8 bits, such as an arbitrary scalar value 310 of FIG. 3, but the example embodiments are not limited thereto.

When the scalar value 310 is 8 bits and the window size is 2, the scalar value 310 may be divided into 2 pieces of 4 each, like a scalar value 311, and scalar multiplication may be performed in parallel, but the example embodiments are not limited thereto.

However, when the scalar value 310 is 8 bits and the window size is 3, the scalar value 310 cannot be equally divided into 3, like the scalar value 312. Thus, when the scalar value 310 is 8 bits and the window size is 3, scalar multiplication cannot be performed in parallel.

In addition, when a scalar value 320 is represented by 7 bits, and the window size is 2, the scalar value 320 cannot be equally divided into two, like the scalar value 321. Accordingly, when the scalar value 310 is 7 bits and the window size is 2, scalar multiplication cannot be performed in parallel, etc.

Also, when the scalar value 320 is 7 bits and the window size is 3, the scalar value 320 cannot be equally divided into 3, like the scalar value 322. Accordingly, when the scalar value 310 is 7 bits and the window size is 3, scalar multiplication cannot be performed in parallel, etc.

Figure 4:
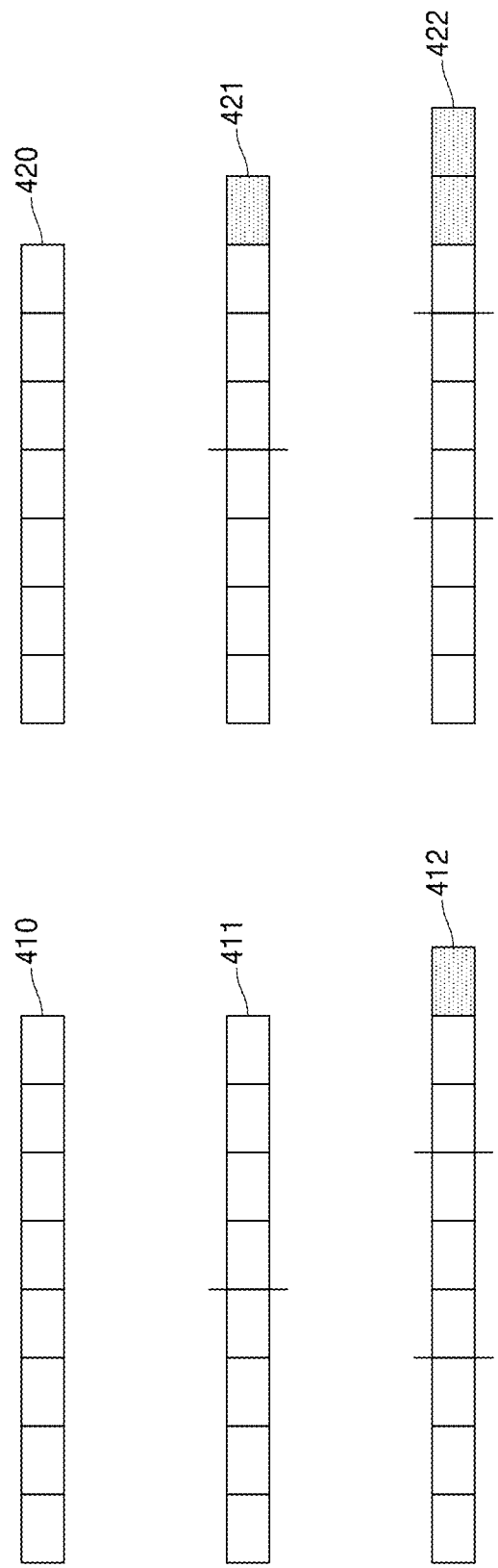
FIG. 4 is a diagram for describing an encryption method according to at least one example embodiment.

FIG. 4 is a diagram for describing an encryption method according to at least one example embodiment. According to at least one example embodiment, the encryption method of FIG. 4 may be performed by an electronic device, processing circuitry, and/or a computing device, etc. Examples of the electronic device, processing circuitry, and/or computing device is discussed in further detail in connection with FIGS. 9 to 11, but the example embodiments are not limited thereto.

Referring to FIG. 4, in the encryption method according to at least one example embodiment, a scalar multiplication operation may be performed using a fixed-base comb method. However, in order to perform a scalar multiplication operation using the fixed-based comb method, the number of bits of a scalar value has to be a multiple of a window size.

For example, the scalar value may be expressed as a binary number and may be expressed as 8 bits, such as an arbitrary scalar value 410 of FIG. 4, but is not limited thereto.

When the scalar value 410 is 8 bits and the window size is 2, the scalar value 410 may be divided into 2 pieces of 4 each, like a scalar value 411, and scalar multiplication may be performed in parallel, etc.

However, when the scalar value 410 is 8 bits and the window size is 3, the scalar value 410 cannot be equally divided into 3 like the scalar value 312. Thus, when the scalar value 310 is 8 bits and the window size is 3, scalar multiplication cannot be performed in parallel. However, when the scalar value 410 may be expressed with 9 bits like a scalar value 412, even when the window size is 3, scalar multiplication may be performed in parallel.

When the scalar value 420 is represented by 7 bits and the window size is 2, the scalar value 420 cannot be equally divided into two like the scalar value 421. Accordingly, when the scalar value 410 is 7 bits and the window size is 2, scalar multiplication cannot be performed in parallel. However, when the scalar value 420 may be expressed with 8 bits like the scalar value 421, scalar multiplication may be performed in parallel even when the window size is 2, etc.

Also, when the scalar value 420 is 7 bits and the window size is 3, the scalar value 420 cannot be equally divided into 3, like the scalar value 422. Accordingly, when the scalar value 420 is 7 bits and the window size is 3, scalar multiplication cannot be performed in parallel. However, when the scalar value 420 may be expressed with 9 bits like a scalar value 422, even when the window size is 3, scalar multiplication may be performed in parallel, etc.

That is, in order to use the fixed-base comb method in the elliptic curve encryption method, it may be desired and/or necessary to change the number of bits of a scalar value to a multiple of the window size while maintaining the same result of scalar multiplication. According to the encryption method of at least one example embodiment, the number of bits of a scalar value may be changed to a multiple of a window size while maintaining the same result of scalar multiplication, and thus, scalar multiplication may be performed in parallel at any time. For example, in the encryption method according to at least one example embodiment, the number of bits of a scalar value may be changed using a signed digit representation method, but is not limited thereto. Details regarding the signed digit representation are described below.

Figure 5:
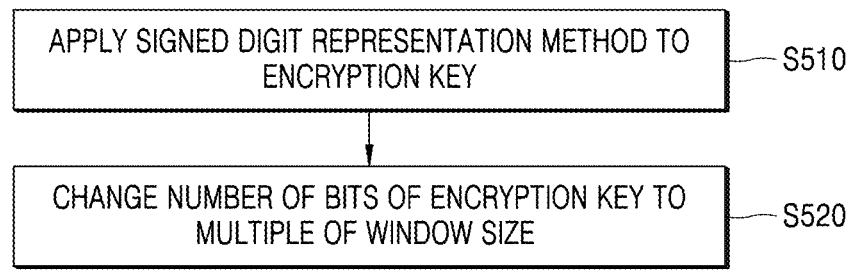
FIG. 5 is a flowchart for describing an encryption method according to at least one example embodiment.

FIG. 5 is a flowchart for describing an encryption method according to at least one example embodiment. According to at least one example embodiment, the encryption method of FIG. 5 may be performed by an electronic device, processing circuitry, and/or a computing device, etc. Examples of the electronic device, processing circuitry, and/or computing device is discussed in further detail in connection with FIGS. 9 to 11, but the example embodiments are not limited thereto.

Referring to FIG. 5, in the encryption method according to at least one example embodiment, in operation S510, a signed digit representation method may be applied to an encryption key, etc.

The encryption key may correspond to the scalar value described above, but is not limited thereto. Thus, as described above, the number of bits of the encryption key may have to be a multiple of a window size. However, the encryption key may be a random number generated through random number generation, and the bit length of the encryption key may not be determined in advance and/or predetermined. Therefore, in the encryption method according to at least one example embodiment, the signed digit representation method may be applied to change the number of bits of the generated encryption key.

For example, when the signed digit representation method is applied, a scalar value 1 may be expressed as follows.

$$1 = 2 - 1 = 4 - 2 - 1 = 8 - 4 - 2 - 1 = \ldots$$

Here, when $-1$ is expressed as $\bar{1}$ and the above equation is expressed as a binary number, to which $\bar{1}$ is added, this may be expressed as $1_2 = 1\bar{1}_2 = 1\bar{1}\bar{1}_2 = \ldots$. In other words, by applying the signed digit representation method, a number may be expressed by converting (e.g., representing) the number into various lengths.

Accordingly, in the encryption method according to at least one example embodiment, the number of bits of the encryption key may be changed to a multiple of the window size in operation S520 by using the signed digit representation method described above, but the example embodiments are not limited thereto.

When the algorithm of the signed digit representation method is expressed in code, it may be as follows, but is not limited thereto.

TABLE 2

Algorithm 2. Signed-digit representation

INPUT : $k = (k_{t-1}, \ldots, k_1, k_0)_2$, where $k_i$s are all 1 or real 0, $m \geq t$
OUTPUT : $k' = (k'_{m-1}, \ldots, k'_1, k'_0)_2$ where $k'_i$s
are all 1 or 0 (but means $-1$)
1. $k' = (1, k_1, \ldots, k_1)_2$
2. if $m > t$, then $k' = (1, 0, \ldots, 0, k_{t-1}, \ldots, k_1)_2$
3. Return $k'$.

By applying the signed digit representation method to a scalar value to express the scalar value with numbers of 1 and $\bar{1}$, a computer, a processor, a computer program, etc., may not recognize the value of $\bar{1}$. Therefore, after applying the signed digit representation method to a scalar value, $\bar{1}$ may be expressed with 0. For example, when 1 is changed by using the signed digit representation method and expressed as $1\bar{1}\bar{1}_2$, since a computer, a processor, a computer program, etc., may not be able to recognize $\bar{1}$, 1 may be changed to be expressed as $100_2$. However, when multiplying $100_2$ and a vector in the process of performing scalar multiplication in parallel afterwards, by designing an algorithm to multiply the vector by $-1$ when 0 appears in the scalar value, $\bar{1}$ expressed with 0 may be compensated for.

However, unlike the above, when changing a scalar value by the signed digit representation method, there may be a problem when the scalar value is expressed with $-1$, 0, and $\bar{1}$. Since this is a situation that can occur when the scalar value is even, a process of changing the scalar value to an odd number may be desired and/or required. If the scalar value is changed to an odd number, the scalar value may be expressed with only 1 or $\bar{1}$. A process of changing the scalar value to an odd number is described below.

Figure 6:
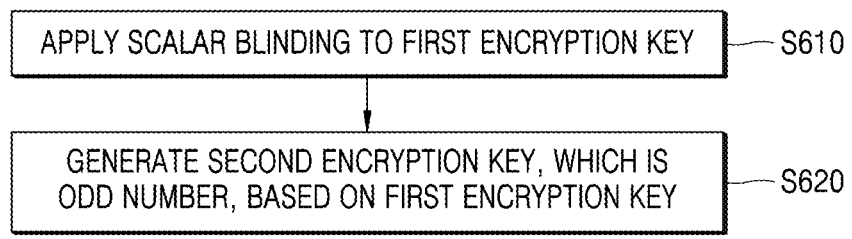
FIG. 6 is a flowchart for describing an encryption method according to at least one example embodiment.

FIG. 6 is a flowchart for describing an encryption method according to at least one example embodiment. According to at least one example embodiment, the encryption method of FIG. 6 may be performed by an electronic device, processing circuitry, and/or a computing device, etc. Examples of the electronic device, processing circuitry, and/or computing device is discussed in further detail in connection with FIGS. 9 to 11, but the example embodiments are not limited thereto.

Referring to FIG. 6, in the encryption method according to at least one example embodiment, in operation S610, scalar blinding may be applied to a first encryption key.

When the signed digit representation method described above is applied to scalar values, the number of bits may be controlled with values of 1, 0, and $\bar{1}$ and may be expressed as a binary number.

In addition, when the signed digit representation method is applied, when the scalar value is odd, the scalar value may be expressed with values of only 1 and $\bar{1}$. Here, it may be desired and/or necessary to express a scalar value as an odd number so that a processor processing encryption (e.g., performing encryption, etc.) recognizes only two numbers instead of three numbers, etc.

In the encryption method according to at least one example embodiment, in operation S620, a second encryption key, which is an odd number, may be generated based on the first encryption key. In other words, a second encryption key having an odd number of bits is generated based on a first encryption key (e.g., an initial encryption key), etc.

When the first encryption key is k, the second encryption key is k', a random number is r, and the order for an arbitrary point G (vector) on the elliptic curve is n (where n is an odd number), k'G=(k+r*n)G=kG may be established. In detail, since n is the order of G, nG may be an additive identity of the elliptic curve. Therefore, k'G=(k+r*n)G=kG+(rn)G=kG may be established. This process of changing the k value to a k' value by using the additive identity may be referred to as scalar blinding.

In the encryption method according to at least one example embodiment, the second encryption key, which is an odd number, may be generated based on the first encryption key through scalar blinding, but is not limited thereto. In detail, the second encryption key that is an odd number may be generated by adding an additive identity to the first encryption key.

For example, since the order n is an odd number as described above, if the first encryption key k is an even number, r may be set to an odd number, and if k is an odd number, r may be set to an even number, so that the second encryption key k', which is always an odd number may be obtained. Even if scalar blinding is performed several times with the same first encryption key k as an operand, since the value of the random number r is randomly changed each time scalar blinding is performed, the value of k', which is the second encryption key, may also change each time. Thus, it is possible to respond to, combat, reduce the risk of, etc., an attack targeting exposure of k, such as a template attack.

Figure 7:
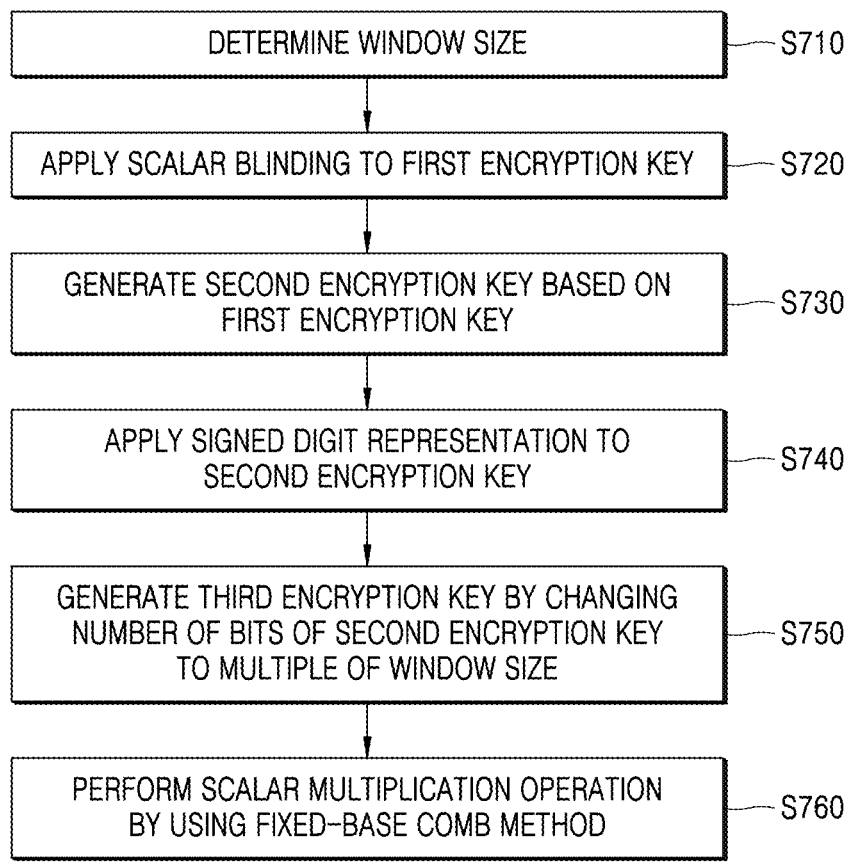
FIG. 7 is a flowchart for describing an encryption method according to at least one example embodiment.

FIG. 7 is a flowchart for describing an encryption method according to at least one example embodiment. According to at least one example embodiment, the encryption method of FIG. 7 may be performed by an electronic device, processing circuitry, and/or a computing device, etc. Examples of the electronic device, processing circuitry, and/or computing device is discussed in further detail in connection with FIGS. 9 to 11, but the example embodiments are not limited thereto.

Referring to FIG. 7, according to the encryption method according to at least one example embodiment, a window size may be determined in operation S710. In detail, in the encryption method, a window size indicating the number of groups for performing scalar multiplication in parallel may be determined.

In the encryption method, a window size may be determined based on a capacity of a buffer configured to store an encryption key and a vector when performing a scalar multiplication operation, but the example embodiments are not limited thereto.

In the encryption method according to at least one example embodiment, scalar blinding may be applied to the first encryption key in operation S720, and a second encryption key may be generated based on the first encryption key in operation S730, etc.

In detail, the first encryption key is to be expressed with 1 and $\bar{1}$ only and thus needs to be changed to an odd number. Accordingly, in the encryption method, a second encryption key, which is an odd number, may be generated by applying scalar blinding to the first encryption key. Here, in the encryption method, even when the first encryption key is an odd number, a second encryption key that is a new odd number may be generated by applying scalar blinding to the first encryption key, and the security may be strengthened by applying scalar blinding regardless of the value of the first encryption key, but the example embodiments are not limited thereto.

In the encryption method according to at least one example embodiment, in operation S740, signed digit representation may be applied to the second encryption key, and in operation S750, the number of bits of the second encryption key may be changed to a multiple of the window size in order to generate a third encryption key, etc. In the encryption method, the number of bits of the second encryption key may be adjusted to a desired value by applying signed digit representation to the second encryption key, and the second encryption key may be changed to a multiple of the window size described above for parallel scalar multiplication, etc.

Also, in the encryption method according to at least one example embodiment, in operation S760, the scalar multiplication operation may be performed in parallel using the fixed-base comb method, but is not limited thereto.

Figure 8:
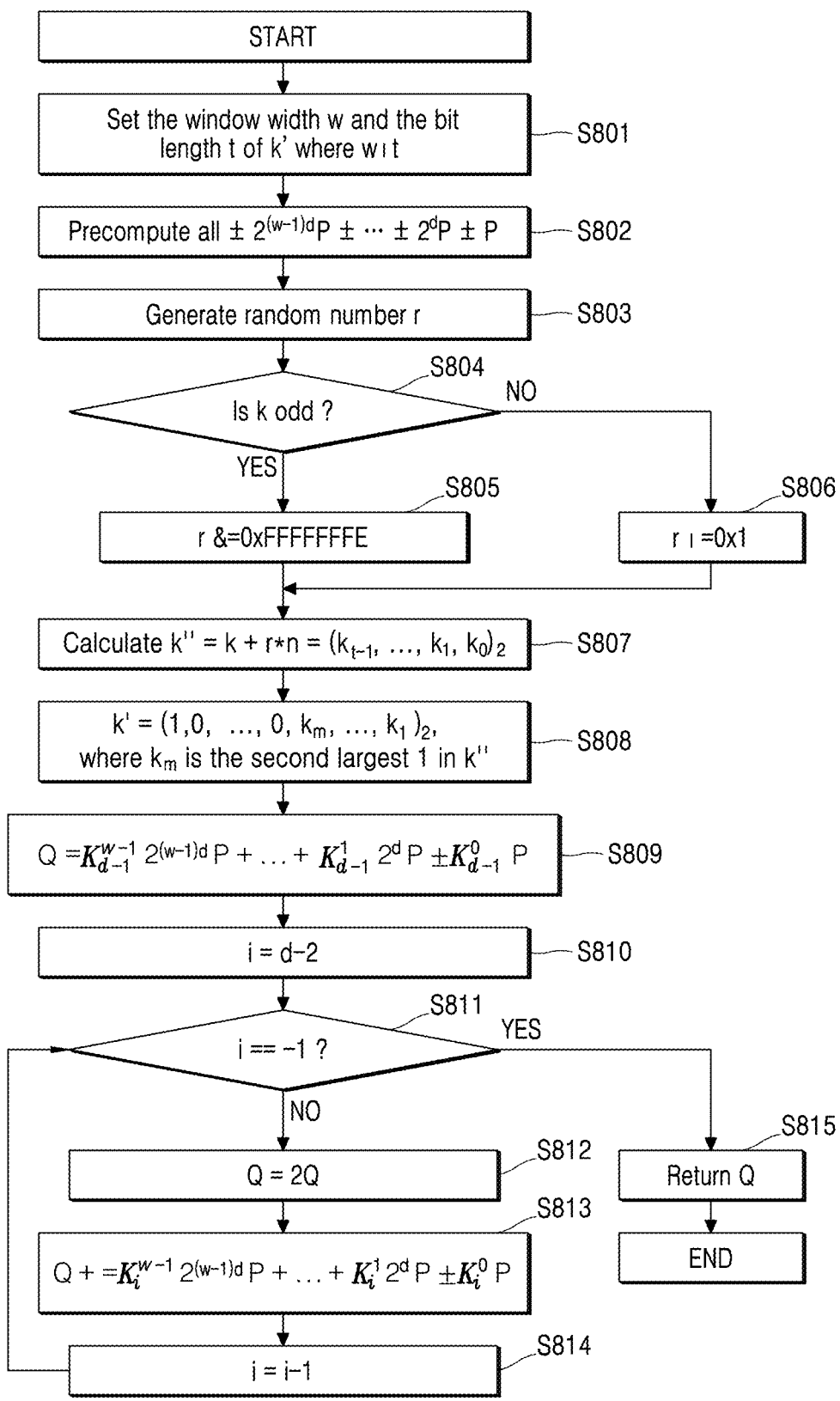
FIG. 8 is a flowchart for describing an encryption method according to at least one example embodiment.

FIG. 8 is a flowchart for describing an encryption method according to at least one example embodiment. According to at least one example embodiment, the encryption method of FIG. 8 may be performed by an electronic device, processing circuitry, and/or a computing device, etc. Examples of the electronic device, processing circuitry, and/or computing device is discussed in further detail in connection with FIGS. 9 to 11, but the example embodiments are not limited thereto.

Referring to FIG. 8, in operation S801, in the encryption method according to at least one example embodiment, a window width (which may also be referred to as a window size) w and a bit length of the third encryption key k' may be set. The number of bits of the third encryption key k' is a multiple of the window width w. In the description with reference to FIG. 8, algorithms of Table 1 to Table 3 may be referred to, but the example embodiments are not limited thereto.

In operation S802, in the encryption method, $\pm 2^{(w-1)d} P \pm \ldots \pm 2^d P \pm P$ may be calculated in advance. This is a process of applying the fixed-base comb method described above, and may correspond to pre-calculating scalar multiplication to correspond to the number of cases in which scalar multiplication may and/or can occur, before calculating scalar multiplication in parallel.

In the encryption method, in operation S803, a random number r may be generated.

In the encryption method, in operation S804, whether the first encryption key k is an odd number may be determined.

In the encryption method, in operation S805, when the first encryption key k is an odd number, r may be set to an even number by setting the rightmost bit (e.g., least significant bit) of the random number r to 0.

In the encryption method, in operation S806, if the first encryption key k is an even number, r may be set to an odd number by setting the rightmost bit (e.g., least significant bit) of the random number r to 1.

In the encryption method, in operation S807, a second encryption key k" may be calculated. This may correspond to a process of applying the scalar blinding method described above, but is not limited thereto. In detail, the calculation of $k''=k+r*n=(k_{t-1}, \ldots, k_1, k_0)_2$ may be performed, etc.

In the encryption method, in operation S808, a third encryption key k' may be generated. This may correspond to a process of applying the signed digit representation method described above, but is not limited thereto. In detail, k' may be generated through $k'=(1,0,\ldots,0,k_m,\ldots,k_1)_2$ (where $k_m$ may correspond to the second largest 1 among k").

In the encryption method, in operations S809 to S815, the fixed-base comb method may be applied, but the example embodiments are not limited thereto. In detail, a fixed-based comb method may be applied by dividing bits of the generated third encryption key into groups having a window width w and multiplying the bits by a vector from the left bit of each group.

In detail, in operation S809, $Q=k_{d-1}^{w-1}2^{(w-1)d}P+\ldots+K_{d-1}^{1}2^{d}P\pm K_{d-1}^{0}P$ may be set and in operation S810, $i=d-2$ may be set. In addition, in operation S811, it may be determined whether i is −1, and when i is −1, a Q value may be returned (e.g., operation S815).

In addition, if i is not −1, Q may be doubled in operation S812, and in operation S813, operation of $Q+=K_i^{w-1}2^{(w-1)d}P+\ldots+K_i^{1}2^{d}P\pm K_i^{0}P$ may be performed. Also, in operation S814, 1 may be subtracted from the value of i and the method may return to operation S811.

The algorithm shown in FIG. 8 expressed in code may be as follows, but is not limited thereto.

TABLE 3

Algorithm 3. Variable length fixed multi-base comb method for scalar multiplication INPUT : Window width w, $k = (k_{t-1}, \ldots, k_1, k_0)_2$, $P \in E(\mathbb{F}_q)$
OUTPUT: Q = kP = k'P (mod n)
0. (Precomputing operation) Knowing t and the bit length of random integer r used in scalar blinding, set the window size w so that blinded k has the bit length of a multiple of w and precompute $(a_{w-1}, \ldots, a_1, a_0)_2 P$ for all bit strings $(a_{w-1}, \ldots, a_1, a_0)$ of length w. ($a_i \in \{1, -1\}$ for all i)
1. Let d = ⌈t/w⌉, using signed-digit representation and scalar blinding, write $k' = k + r * n = K^{w-1}|| \ldots ||K^1||K^0$ where the bit length of k is a multiple of w, r is a
   random number which makes k' an odd number, and each $K^j \in \{-1, 1\}$ is a bit
   string of length d. Let $K_i^j$ denote the ith bit of $K^j$.
2. $Q \leftarrow \infty$.
3. For i from d − 1 down to 0 do
   3.1. $Q \leftarrow 2Q$.
   3.2. $Q \leftarrow Q + (K_i^{w-1}, \ldots, K_i^1, K_i^0)_2 P$.
4. Return Q.

Also, an example of an encryption method according to at least one example embodiment may be as follows.

First, it is assumed that k, a scalar value, is an arbitrary integer smaller than n, which is an order of a vector on an elliptic curve, but the example embodiments are not limited thereto. Also, it is assumed that the random number r is an integer within a 5-bit range, but is not limited thereto. Assuming that $n=7=111_2$, the encryption method of at least one example embodiment may attempt to perform a scalar multiplication operation of kP for an arbitrarily selected k and a point P (vector) on an elliptic curve. Since k is assumed to be smaller than n, k may be an integer within a 3-bit range. Also, based on the capacity of the buffer used to perform a scalar multiplication operation, the window size w may be assumed to be 4, but is not limited thereto.

If scalar blinding is applied to k, k may be an integer within 8 bits. If k", which is a value obtained by applying scalar blinding to k, is 8 bits, the fixed-base comb method described above in accordance with one or more example embodiments may be applied because the bit length of k" is a multiple of 4, which is equal to or less than the window size. In other words, since it is assumed that the window size is 4, a scalar multiplication operation may be performed in parallel by dividing an 8-bit scalar value by 4.

In order to apply the fixed-base comb method, multiplication of a scalar value that is divided by bits, and a vector may be calculated in advance. In detail, the fixed-base comb method is to be performed by dividing a scalar value, which is 8 bits, into four pieces, a total of sixteen values of $\{\pm P \pm 100_2 P \pm 10000_2 P \pm 1000000_2 P\}$, which is a combination of $\pm P$, $\pm 100_2 P$, $\pm 10000_2 P$, and $\pm 1000000_2 P$ may be calculated and stored in a buffer, but the example embodiments are not limited thereto.

It may be assumed that an arbitrary k is 5, and a random number r randomly extracted within a 5-bit range may be assumed to be 21, but are not limited thereto. Since k is odd, 20 may be obtained by taking r=r&0xFFFFFFFE for r (changing the value of the rightmost bit (e.g., least significant bit, etc.) to 0). Also, scalar blinding may be performed with 20 and k. Specifically, k", which is a value obtained by performing scalar blinding on k, may be expressed as $k''=k+r*n=5+20*7=145=10010001_2$. Applying the signed digit representation method to k", k" may be expressed as $k''=10010001_2=11\bar{1}\bar{1}\bar{1}\bar{1}\bar{1}1_2$. In $11\bar{1}\bar{1}\bar{1}\bar{1}\bar{1}1_2$ to which the signed digit representation method is applied, k' in which $\bar{1}$ is expressed with 0 may be expressed as $k'=11001000_2$. Here, since the value of 0 of k' is nothing more than expressing −1 with 0 to express the same value as a number that is recognizable by a computer, when performin"a s"lar multiplication ope"tion, −1 should be multiplied by a vector instead of 0. In detail, when applying the fixed-base comb method by using k' and P, k' that is divided into four may be expressed as 11, 00, 10, and 00, and the first bits of the values obtained by the dividing are 1, 0, 1, and 0, respectively, and thus, $Q'=1*1000000_2 P+(-1)*10000_2 P+1*100_2 P+(-1)*P=51P$. Since Q' is a value obtained by multiplying and adding the first bit values of the 2 bits by a vector, Q' is to be doubled (e.g., doubling). Therefore, $2Q'=102P$. In addition, since the second bits of the values obtained by dividing k' are 1, 0, 0, and 0, respectively, $Q''=1*1000000_2 P+(-1)*10000_2 P+(-1)*100_2 P+(-1)*P=43P$ may be obtained. The final scalar multiplication result, Q, is $Q=Q'+Q''=102P+43P=145P$. Since it is assumed that n, which is the order of the vector P, is 7, $Q=(145 \mod 7)P=5P$, so that a desired value of kP may be obtained.

As another example, it is assumed that the scalar value k is an arbitrary integer smaller than n, which is the order of a vector on an elliptic curve. Also, it is assumed that the random number r is an integer within a 5-bit range. Assuming that $n=9=1001_2$, the encryption method may attempt to perform a scalar multiplication operation of kP for an arbitrarily selected k and a point P (vector) on an elliptic curve. Since k is assumed to be smaller than n, k may be an integer within a 4-bit range. Also, based on the capacity of the buffer used to perform the scalar multiplication operation, it is assumed that the window size w is 3.

If scalar blinding is applied to k, k may be an integer within 9 bits. If k", which is a value obtained by applying scalar blinding to k, is 9 bits, the fixed-base comb method described above may be applied because the bit length of k" is a multiple of 3, which is the window size. In other words, since it is assumed that the window size is 3, a scalar multiplication operation may be performed in parallel by dividing a 9-bit scalar value by 3.

In order to apply the fixed-base comb method, multiplication of a scalar value that is divided by bits and a vector may be calculated and/or calculated in advance. In detail, the fixed-base comb method is to be performed by dividing a 9-bit scalar value by 3, a total of eight values of $\{\pm P \pm 100_2 P \pm 1000000_2 P\}$, which is a combination of $\pm P$, $\pm 1000_2 P$, and $\pm 1000000_2 P$, may be calculated and stored in a buffer.

It may be assumed that an arbitrary k is 8, and a random number r randomly extracted within a 5-bit range may be assumed to be 20. Since k is an even number, 21 may be obtained by applying r=r |01 to r (changing the value of the rightmost bit to 1). Also, scalar blinding may be performed with 21 and k. Specifically, k", which is a value obtained by performing scalar blinding on k, may be expressed as $k''=k+r*n=8+21*9=197=11000101_2$. Applying the signed digit representation method to k", k" may be expressed as $k''=11000101_2=1\bar{1}11\bar{1}\bar{1}\bar{1}1\bar{1}_2$. In $1\bar{1}11\bar{1}\bar{1}\bar{1}1\bar{1}_2$, to which the signed digit representation method is applied, k' in which $\bar{1}$ is expressed with 0 may be expressed as $k'=101100010_2$. Here, since the 0 value of k' is nothing more than expressing −1 with 0 to express the same as a number that is recognizable by a computer, when performing a scalar multiplication operation, −1 should be multiplied by the vector instead of 0. In detail, when applying the fixed-base comb method by using k' and P, k' that is divided into three may be expressed as 101, 100, and 010, and the first bits of the values obtained by the dividing are 1, 1, and 0, respectively, and thus, $Q'=1*1000000_2 P+1*1000_2 P+(-1)*P=71P$. In addition, since the second bits of the values obtained by dividing k' are 0, 0, and 1, respectively, $Q''=(-1)*1000000_2 P+(-1)*1000_2 P+1*P=-71P$ may be obtained. In addition, when calculating the product of the vector and the value for the last bits (1, 0, 0) among the divided bits, $Q'''=1*1000000_2 P+(-1)*1000_2 P+(-1)*P=55P$ may be obtained. The final scalar multiplication result, Q, becomes $Q=2*2Q'+2*Q''+Q'''=197P$. Since it is assumed that n, which is the order of the vector P, is 9, Q=(197 mod 9) P=8P and a desired kP value may be obtained.

Figure 9:
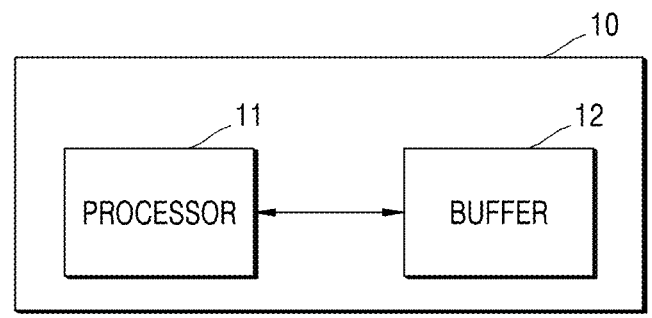
FIG. 9 is a block diagram of an electronic device according to at least one example embodiment.

FIG. 9 is a block diagram of an electronic device according to at least one example embodiment.

Referring to FIG. 9, an electronic device 10 according to at least one example embodiment may include a buffer 12 configured to store at least one encryption key, a prescribed reference vector of an elliptic curve, and/or values calculated in operation S802 of FIG. 8, but not limited thereto, and at least one processor 11 configured to perform ECC, etc., but the example embodiments are not limited thereto. For example, the processor 11 may be configured to determine a window size indicating the number of groups for performing scalar multiplication in parallel, generate a second encryption key that is an odd number based on the first encryption key, generate a third encryption key by changing the number of bits of the second encryption key to a multiple of the window size, and/or perform a scalar multiplication operation on the third encryption key and a vector in parallel based on the window size, etc. According to some example embodiments, the processor 11 may be the application processor 700 of FIG. 10, but the example embodiments are not limited thereto.

Figure 10:
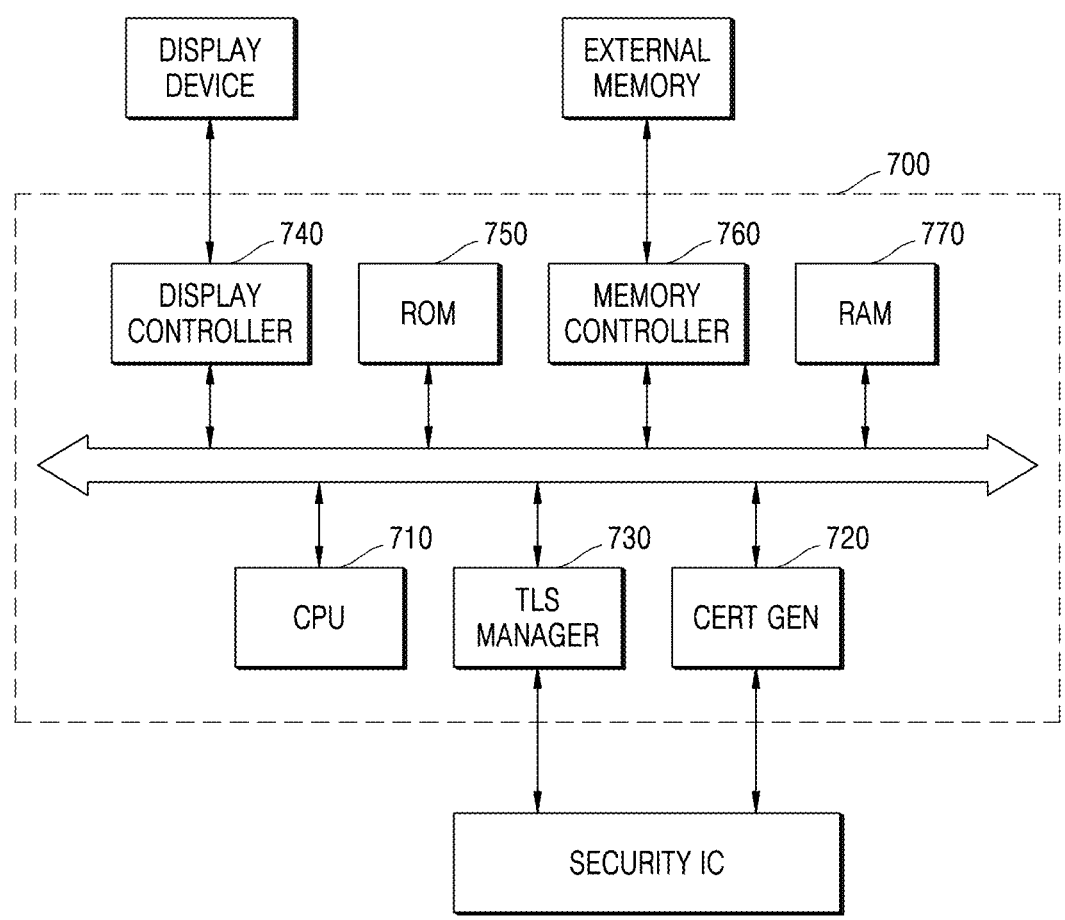
FIG. 10 is a block diagram illustrating an implementation example of an application processor according to at least one example embodiment.

FIG. 10 is a block diagram illustrating an implementation example of an application processor according to at least one example embodiment.

Referring to FIG. 10, an application processor 700 may be implemented as processing circuitry, e.g., a system on chip (SoC), etc., and the application processor 700 may be mounted on a device according to some example embodiments and control overall operations of the device, for example, the electronic device 10 of FIG. 9, etc. The application processor 700 may include a central processing unit (CPU) 710, a certificate generator 720, a Transport Layer Security (TLS) manager 730, a display controller 740, read only memory (ROM) 750, a memory controller 760, and/or random access memory (RAM) 770, etc., but is not limited thereto. In addition to the illustrated components, the application processor 700 may further include other components such as a power management unit, a graphics processing unit (GPU), and/or a clock generator, etc. According to some example embodiments, one or more of the application processor 700, he CPU 710, the certificate generator 720, the TLS manager 730, the display controller 740, the ROM 750, the memory controller 760, the RAM 770, the power management unit, GPU, and/or the clock generator, etc., may be implemented as processing circuitry. Processing circuitry may include hardware or hardware circuit including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

The CPU 710 may process and/or execute programs and/or data stored in the ROM 750 and/or the RAM 770, etc. For example, the CPU 710 may process and/or execute programs and/or data according to and/or based on an operation clock (e.g., a clock signal, etc.). The CPU 710 may be implemented as a multi-core processor, etc. A multi-core processor is a computing component having two or more independent processors (e.g., cores), each of which reads and/or executes program instructions, etc.

The ROM 750 may store programs and/or data non-volatilely. The ROM 750 may be implemented as, e.g., erasable programmable read-only memory (EPROM) and/or electrically erasable programmable read-only memory (EEPROM), etc. Also, the RAM 770 may temporarily store programs, data, and/or instructions, etc. For example, programs and/or data stored in the ROM 750 may be temporarily stored in the RAM 770 under the control of the CPU 710, etc. The RAM 770 may be implemented as a memory, such as dynamic RAM (DRAM) and/or static RAM (SRAM), etc.

The memory controller 760 may interface with at least one external memory device and writes and/or reads data by controlling the at least one external memory device according to and/or based on a data access request, etc. Also, the display controller 740 may control a display operation of at least one screen by driving the at least one of a display device.

According to at least one example embodiment, the application processor 700 may communicate with a security element (and/or security integrated circuit (IC), etc.) that may be implemented as a separate external semiconductor chip, etc. When the application processor 700 is initially driven, a mutual authentication process may be performed for the application processor 700 and the security element according to one or more of the above-described example embodiments. As at least one example embodiment, when mutual authentication is successful, the application processor 700 and the security element may perform encryption communication using a symmetric key or the like.

In addition, according to the above-described example embodiments, the certificate generator 720 and the TLS manager 730 included in the application processor 700 perform various operations for public key-based communication. For example, the application processor 700 may provide a request to the security element so that at least some of functions related to public key-based communication are performed in the security element. According to some of the example embodiments described above, important operations for which related information, such as a digital signature for a certificate and/or a device private key, etc., need not be exposed to the outside (e.g., external devices and/or external entities, etc.) may be performed in the security element, etc.

Figure 11:
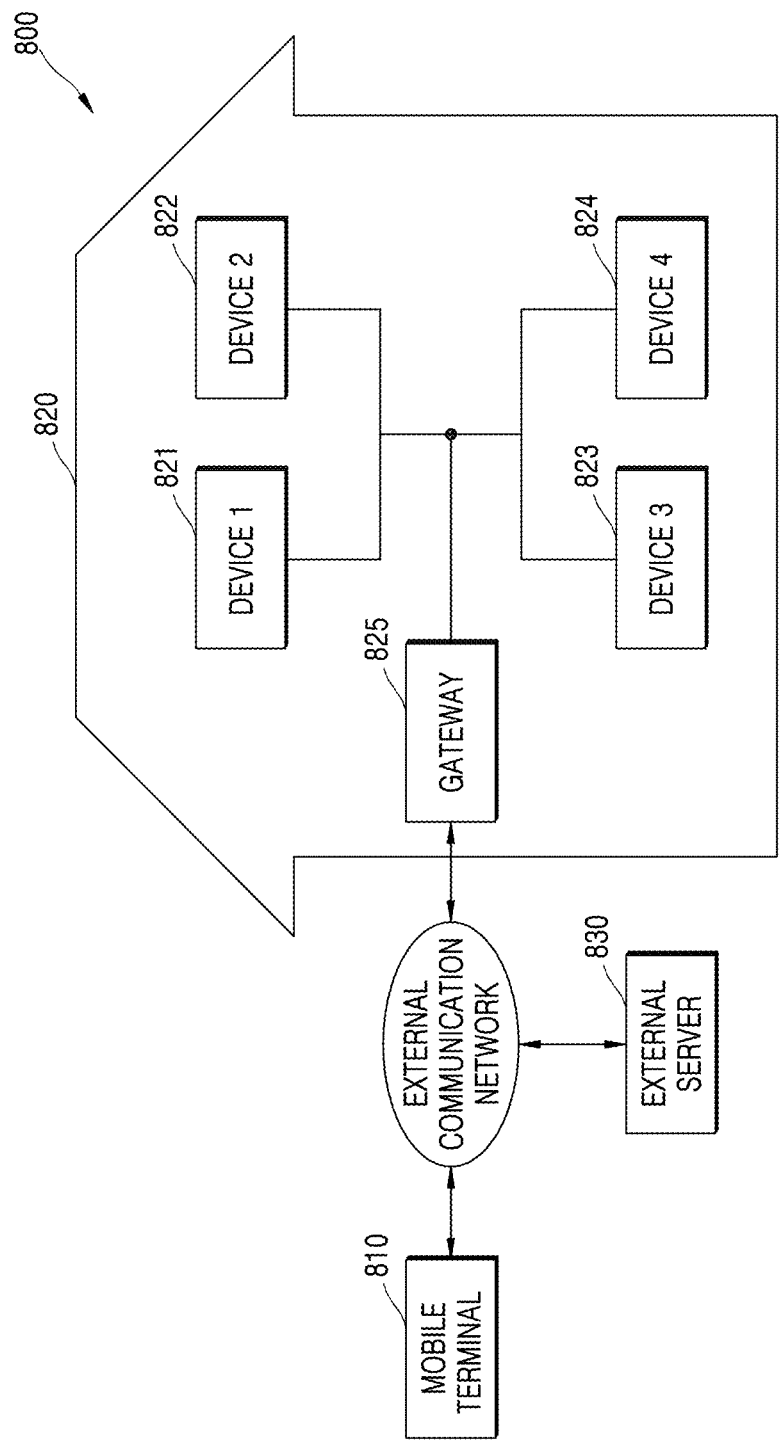
FIG. 11 is a block diagram illustrating a smart home system including a device according to at least one example embodiment.

FIG. 11 is a block diagram illustrating a smart home system including a device according to at least one example embodiment.

Referring to FIG. 11, a plurality of devices 821 to 824 provided in a smart home system 800 may access at least one external server 830 through at least one gateway 825 and an external communication network, and at least one mobile terminal 810 may also access the at least one external server 830 through the external communication network, but the example embodiments are not limited thereto. The plurality of devices 821 to 824 may be home appliances, such as refrigerators, air conditioners, washing machines, and/or vacuum cleaners, etc., used in smart homes, and information, such as status and/or failure diagnoses of the devices 821 to 824 may be provided to the at least one external server 830, etc. The at least one external server 830 receives information of the devices 821 to 824 and provides a smart management service therefor.

Also, a user using the mobile terminal 810 may access the devices 821 to 824 through the external communication network and the gateway 825, tc. In addition, a user using the mobile terminal 810 may access the external server 830 through the external communication network to determine the state of the devices 821 to 824. n the smart home system 800 as described above, as communication based on an encryption method according to at least one example embodiment is performed, security of information transmitted and/or received through an external communication network may be ensured.

That is, each of the devices 821 to 824, the external server 830, and the mobile terminal 810 related to the smart home system 800 may communicate using the encryption method according to one or more of the example embodiments described above. That is, various types of information such as status and/or fault diagnosis of a smart home may be secured and provided to an external server, and the external server may manage the smart home by using the safely received information, etc.

While various example embodiments of the inventive concepts have been particularly shown and described, it will be understood by those of ordinary skill in the art that various changes in form and details may be made therein without departing from the spirit and scope of the example embodiments of the inventive concepts as defined by the following claims.

What is claimed is:

1. An elliptic curve cryptography (ECC) method comprising:
   determining a window size indicating a number of groups for performing scalar multiplication in parallel;
   generating, based on a first encryption key, a second encryption key, the generating the second encryption key including changing a value of the first encryption key, the first encryption key being a random number;
   generating a third encryption key based on the second encryption key, the generating the third encryption key including changing a total number of bits of the second encryption key to be a multiple of the window size by applying a binary number-based value conversion method; and
   performing, in parallel, a scalar multiplication operation with the third encryption key and a vector on an elliptic curve based on the window size by applying a fixed-base comb method based on the window size,
   wherein the second encryption key has a value conforming to the binary number-based value conversion method.

2. The ECC method of claim 1, wherein the determining the window size comprises:
   determining the window size based on a capacity of a memory buffer used to store the third encryption key and the vector during the performing the scalar multiplication operation.

3. The ECC method of claim 1, wherein the generating the second encryption key comprises:
   generating the second encryption key by adding an additive identity to the first encryption key in an elliptic curve addition operation.

4. The ECC method of claim 1, wherein the generating the second encryption key comprises:
   generating the second encryption key by applying scalar blinding to the first encryption key.

5. The ECC method of claim 1, wherein
   the binary number-based value conversion method is a signed digit representation method; and
   the second encryption key has an odd value.

6. The ECC method of claim 5, wherein the generating the third encryption key comprises:
   expressing the second encryption key with 1 and $\overline{1}$ by applying the signed digit representation method to the second encryption key.

7. The ECC method of claim 6, wherein the generating the third encryption key comprises:
   generating the third encryption key by expressing $\overline{1}$ as 0.

8. The ECC method of claim 7, wherein the performing the scalar multiplication operation comprises:
   multiplying the vector by −1 when a bit value of the third encryption key is 0.

9. The ECC method of claim 1, wherein the performing the scalar multiplication operation comprises:
   dividing the third encryption key into groups equal to the window size; and performing, in parallel, scalar multiplication on each group and the vector.

* * * * *